(12) United States Patent  (10) Patent No.: US 9,380,918 B2
Murphy et al.  (45) Date of Patent: Jul. 5, 2016

(54) TOILET WITH LIGHTED SEAT HINGE

(71) Applicant: Kohler Co., Kohler, WI (US)

(72) Inventors: Roger W. Murphy, Kohler, WI (US); Michael Luettgen, Grafton, WI (US); Gary Clarke, Sheboygan, WI (US); Joseph L. Stauber, Sheboygan Falls, WI (US)

(73) Assignee: KOHLER CO., Kohler, WI (US)

( * ) Notice: Subject to any disclaimer, the term of this patent is extended or adjusted under 35 U.S.C. 154(b) by 234 days.

(21) Appl. No.: 14/203,321

(22) Filed: Mar. 10, 2014

(65) Prior Publication Data

US 2014/0250578 A1 Sep. 11, 2014

Related U.S. Application Data

(60) Provisional application No. 61/776,649, filed on Mar. 11, 2013.

(51) Int. Cl.
| | |
|---|---|
| *E03D 11/00* | (2006.01) |
| *A47K 13/24* | (2006.01) |
| *F21V 33/00* | (2006.01) |
| *G02B 6/00* | (2006.01) |
| *A47K 13/12* | (2006.01) |
| *F21Y 101/02* | (2006.01) |

(52) U.S. Cl.
CPC .............. *A47K 13/24* (2013.01); *E03D 11/00* (2013.01); *F21V 33/004* (2013.01); *G02B 6/00* (2013.01); *A47K 13/12* (2013.01); *F21Y 2101/02* (2013.01)

(58) Field of Classification Search
CPC ....................................................... E03D 11/02
USPC ..................................................... 4/300–442
See application file for complete search history.

(56) References Cited

U.S. PATENT DOCUMENTS

| | | | | | |
|---|---|---|---|---|---|
| 1,880,892 | A | * | 10/1932 | Dodge ...................... | F21V 5/00 313/110 |
| 2,206,094 | A | * | 7/1940 | Hobbs ...................... | B60Q 3/06 180/69.2 |
| 2,336,677 | A | * | 12/1943 | Frey ........................ | F21V 33/00 362/394 |
| 2,460,543 | A | * | 2/1949 | Spierer ................ | A47K 13/302 4/233 |
| 2,721,531 | A | * | 10/1955 | Findley, Jr. ............ | A47K 13/24 116/67 R |
| 2,766,716 | A | * | 10/1956 | Mackey ................. | A47K 11/04 116/67 R |
| 2,947,850 | A | * | 8/1960 | Reilly ...................... | E03D 9/00 362/154 |
| 3,045,096 | A | * | 7/1962 | Cyril .................... | A47K 13/305 219/217 |

(Continued)

FOREIGN PATENT DOCUMENTS

| | | |
|---|---|---|
| CN | 201175307 Y | 1/2009 |
| CN | 201234379 | 5/2009 |

(Continued)

*Primary Examiner* — Lori Baker
(74) *Attorney, Agent, or Firm* — Foley & Lardner LLP

(57) ABSTRACT

Various disclosed systems relate to fixtures, such as toilets, that include a lighting mechanism for illuminating portions of the fixture. One embodiment relates to a toilet. The seat assembly of the toilet includes a hinge assembly having a hinge housing and a lighting mechanism. The lighting mechanism is at least partially encapsulated by the hinge housing. The lighting mechanism including a first light source and a power source. The seat assembly further includes a lid pivotally connected to the hinge assembly. The seat assembly includes a ring pivotally connected to the hinge assembly. The lighting mechanism is configured to direct light at the tank and to direct light into the bowl such that light is reflected off of the tank and off of an interior of the bowl.

17 Claims, 12 Drawing Sheets

(56) References Cited

U.S. PATENT DOCUMENTS

| | | | | |
|---|---|---|---|---|
| 3,982,288 A * | 9/1976 | Borne | A47K 13/24 | 4/234 |
| 4,413,364 A * | 11/1983 | Bittaker | A47K 17/00 | 362/131 |
| 4,491,991 A * | 1/1985 | Herbruck | A47K 13/24 | 116/67 R |
| 4,521,833 A * | 6/1985 | Wolter | E05B 17/103 | 362/100 |
| 4,623,955 A * | 11/1986 | Santini | A47K 13/24 | 359/855 |
| 4,636,474 A * | 1/1987 | Ogura | E03D 9/00 | 4/314 |
| 4,731,712 A * | 3/1988 | Amthor | F21L 7/00 | 362/189 |
| 4,733,419 A * | 3/1988 | Nee | A47K 13/24 | 4/234 |
| 4,736,471 A * | 4/1988 | Johnson | A47K 13/24 | 4/234 |
| 4,849,742 A * | 7/1989 | Warrington | G08B 21/22 | 340/545.6 |
| 4,860,178 A * | 8/1989 | Picon | E03D 9/00 | 362/101 |
| 4,883,749 A * | 11/1989 | Roberts | A47K 11/04 | 4/304 |
| 5,003,648 A * | 4/1991 | Anderson | A47K 13/30 | 4/314 |
| 5,036,443 A * | 7/1991 | Humble | F21V 33/004 | 136/291 |
| 5,123,130 A * | 6/1992 | Sanders | A47K 17/00 | 4/234 |
| 5,136,476 A * | 8/1992 | Horn | A47K 17/00 | 362/198 |
| 5,150,962 A * | 9/1992 | Rauschenberger | A47K 17/00 | 362/101 |
| 5,263,209 A * | 11/1993 | Pattee | A47K 13/24 | 362/101 |
| 5,276,595 A * | 1/1994 | Patrie | A47K 13/30 | 362/101 |
| 5,664,867 A * | 9/1997 | Martin | F21V 33/004 | 340/686.1 |
| 5,822,806 A * | 10/1998 | Kizhnerman | E03D 13/00 | 4/302 |
| 5,926,099 A * | 7/1999 | Unum | A47K 13/24 | 200/61.52 |
| 5,926,867 A * | 7/1999 | Buchanan | A47K 13/24 | 353/43 |
| 6,003,160 A * | 12/1999 | Seidle | F21V 33/004 | 4/234 |
| 6,203,164 B1 * | 3/2001 | Tufekci | A47K 13/24 | 362/101 |
| 6,279,180 B1 * | 8/2001 | Bell | A47K 13/24 | 362/84 |
| 6,698,036 B2 * | 3/2004 | Armbruster | A47K 11/06 | 4/483 |
| 6,805,458 B2 * | 10/2004 | Schindler | E03C 1/0412 | 239/18 |
| 7,722,237 B2 * | 5/2010 | Watson | B60Q 3/004 | 362/154 |
| 8,398,257 B1 * | 3/2013 | Paulus | F21V 33/004 | 362/101 |
| 9,041,298 B2 * | 5/2015 | Andy | H05B 37/0227 | 315/133 |
| 2004/0184273 A1 | 9/2004 | Reynolds et al. | | |
| 2008/0060119 A1 * | 3/2008 | Pinizzotto | A47K 13/302 | 4/217 |
| 2011/0191950 A1 * | 8/2011 | Liu | A47K 13/305 | 4/233 |

FOREIGN PATENT DOCUMENTS

| | | |
|---|---|---|
| EP | 0 766 037 A1 | 4/1997 |
| JP | 2001-266627 | 9/2001 |
| JP | 2007-117237 | 5/2007 |
| JP | 2007-197899 | 8/2007 |
| JP | 2010-101034 | 5/2010 |

* cited by examiner

TOILET WITH LIGHTED SEAT HINGE

RELATED APPLICATIONS

This application is claims the benefit of U.S. Provisional Patent Application No. 61/776,649, entitled "TOILET WITH LIGHTED SEAT HINGE," filed on Mar. 11, 2013, which is herein incorporated by reference in its entirety and for all purposes.

SUMMARY

One embodiment relates to a toilet assembly. The toilet assembly includes a toilet base having a bowl and a tank coupled to the toilet base. The toilet assembly further includes a seat assembly connected to the toilet base. The seat assembly includes a hinge assembly having a hinge housing and a lighting mechanism. The lighting mechanism is at least partially encapsulated by the hinge housing. The lighting mechanism including a first light source and a power source. The seat assembly further includes a lid pivotally connected to the hinge assembly. The seat assembly includes a ring pivotally connected to the hinge assembly. The lighting mechanism is configured to direct light at the tank and to direct light into the bowl such that light is reflected off of the tank and off of an interior of the bowl.

Another exemplary embodiment relates to a seat assembly. The seat assembly includes a hinge assembly having a hinge housing and a lighting mechanism. The lighting mechanism is at least partially encapsulated by the hinge housing. The lighting mechanism including a first light source and a power source. The seat assembly further includes a lid pivotally connected to the hinge assembly. The seat assembly includes a ring pivotally connected to the hinge assembly. The lighting mechanism is configured to direct light at a tank of a toilet when the seat assembly is connected to a base of the toilet, and to direct light into a bowl of the toilet such that light is reflected off of the tank and off of an interior of the bowl.

DETAILED DESCRIPTION OF EXEMPLARY EMBODIMENTS

Referring to the FIGURES generally, various embodiments disclosed herein relate to fixtures such as toilets that include a lighting mechanism or similar component for illuminating portions of the fixture to facilitate use of the fixture by users. For example, a lighting mechanism may be integrated into a toilet seat hinge component such that light is transmitted outward from the hinge component in one or more directions (e.g., toward the toilet bowl and/or toward the toilet tank). Such lighting may be useful in low light conditions to provide a "guide light" to direct a user toward the toilet and a "task light" for use of the toilet.

In some embodiments, the lighting mechanism includes a light guide provided within the base/housing of the seat hinge, where the light guide has geometric features (in the form of a "light tube") intended to direct light from a light source (e.g., an LED, etc.) onto external features of the toilet (e.g., the bowl, tank, etc.). The light may be directed in a single direction or in multiple, different directions, and the light may be emitted when the various seat components (e.g., lid, rim/ring, etc.) are in an open and/or closed position.

The toilet and lighted hinge assemblies disclosed herein may provide a stable and securely mounted lighting mechanism that having a relatively easy and tool-less installation. For example, the lighting mechanism may be retained within the hinge of the toilet seat assembly (or a portion thereof) by means of protrusions, etc., ensuring a positive connection between components. Furthermore, by acting as a "guide light" or "task light," particularly in low light conditions, a user can easily locate the toilet, easily know whether the seat (e.g., lid and/or rim/ring) is in an open (e.g., up) position, and have a clear indication of an allowable area for use of the toilet.

Figure 1:
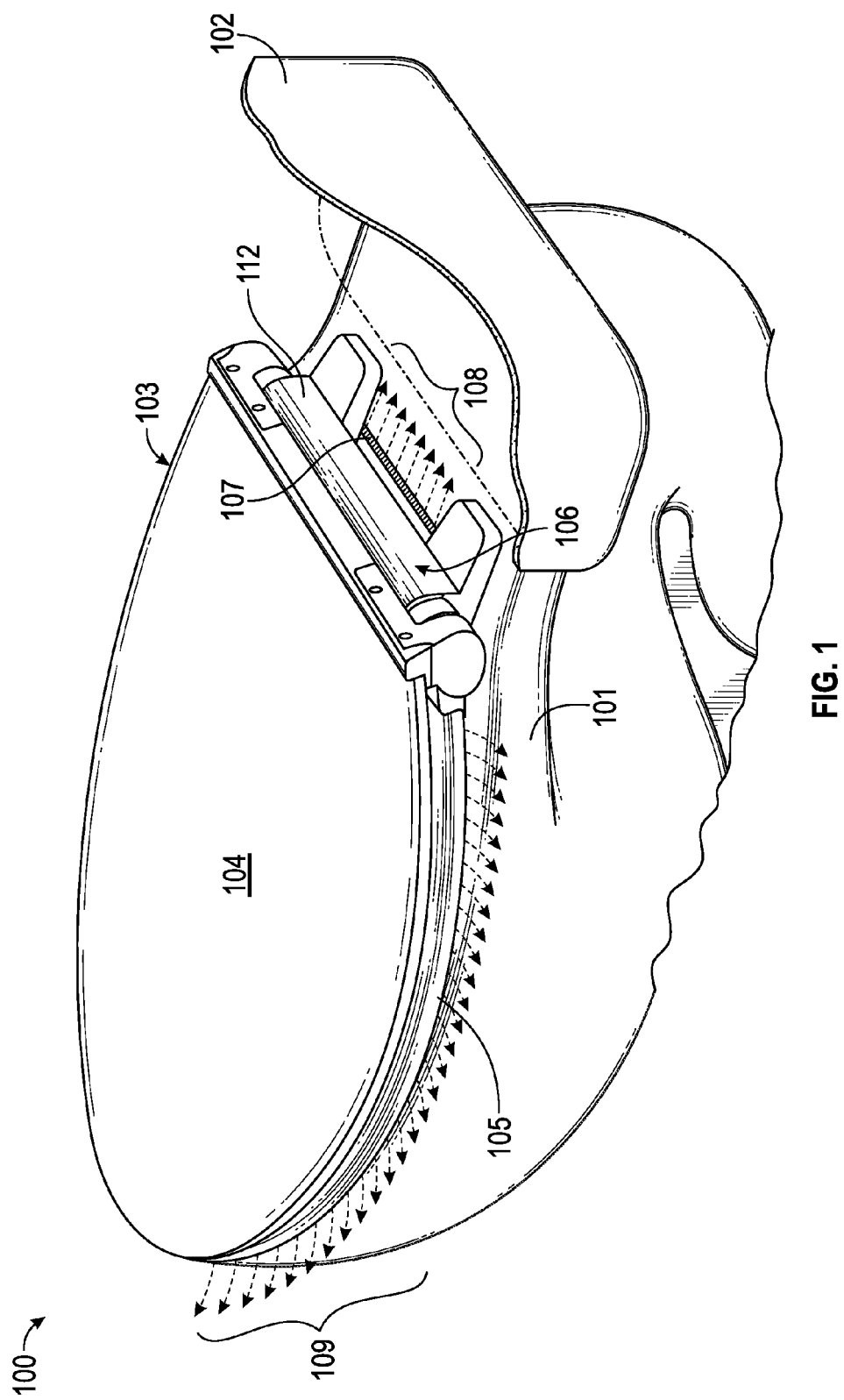
FIG. 1 is a view of a toilet with the lid of a seat assembly in a closed position according to an exemplary embodiment.
Figure 2:
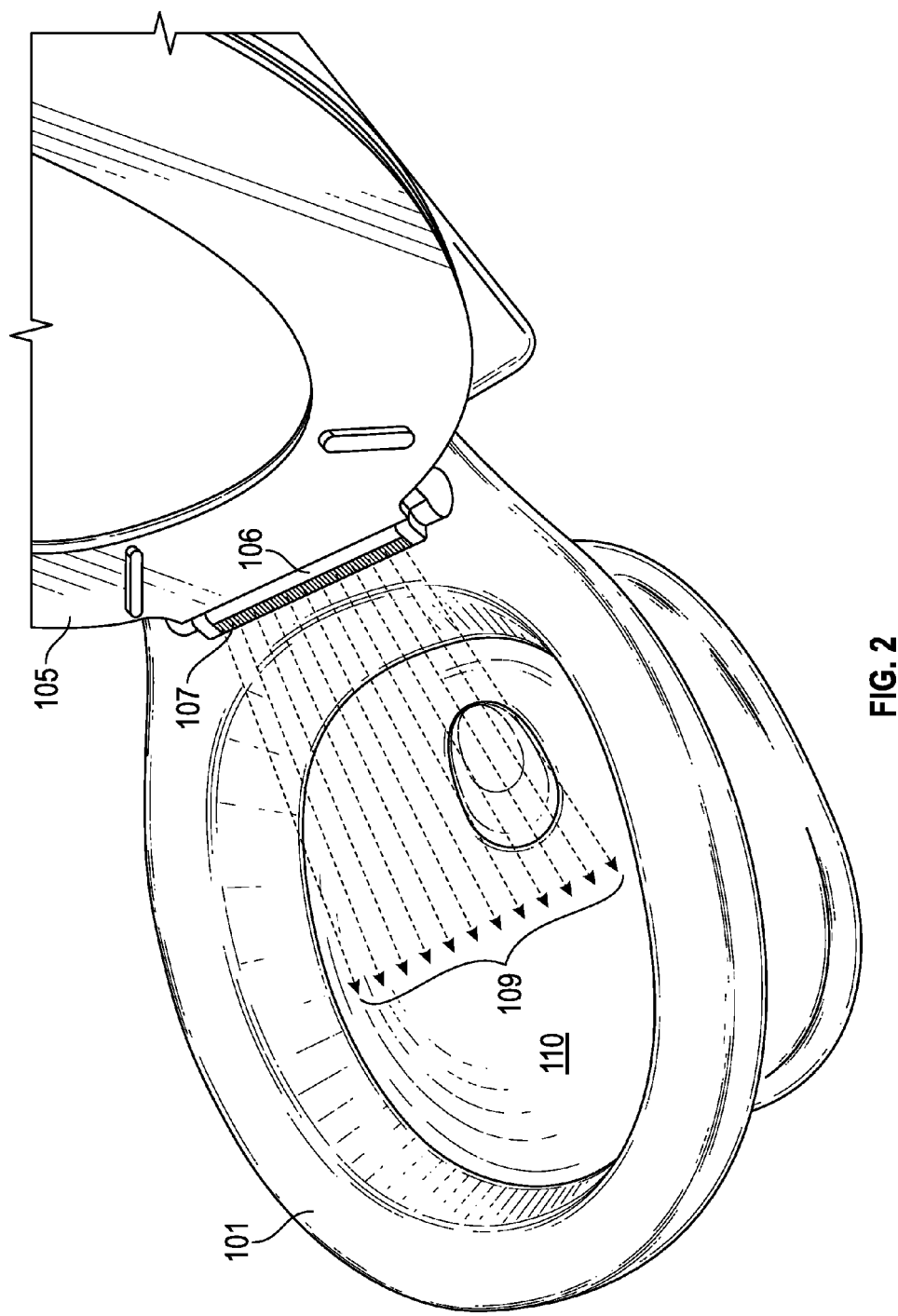
FIG. 2 is a view of a toilet with the lid and seat assembly in an opened position according to an exemplary embodiment.

Referring now to FIG. 1 and FIG. 2, a toilet 100 is shown according to an exemplary embodiment. Toilet 100 includes a base 101 having a bowl 110 (shown in FIG. 2), a tank 102 coupled to base 101, and a seat assembly 103. Seat assembly 103 includes a lid 104, a ring 105, and a hinge assembly 106.

Hinge assembly 106 includes a housing 112. Hinge assembly 106 connects seat assembly 103 to base 101 such that lid 104 and ring 105 are pivotable between a closed position (as shown in FIG. 1) and an open position (as shown in FIG. 2). Lid 104 and ring 105 are independently pivotable.

Hinge assembly 106 includes a lighting mechanism 107. Lighting mechanism 107 is at least partially encapsulated in housing 112 of hinge assembly 106. Lighting mechanism 107 is configured to direct light 108 toward tank 102 such that light 108 is reflected off of tank 102. Light 108 provides, among other things, a guide light to the toilet such that a user can locate the toilet in a dark room. Lighting mechanism 107 is further configured to direct light 109 into an interior of the bowl 110 such that light 109 is reflected off of the interior of the bowl 110. Light 109 that is directed into bowl 110 provides a task light such that the area of bowl 110 is illuminated for enhanced user aiming in a dark room. When lid 104 and ring 105 are in the closed position, a portion of light 109 is directed away from the toilet (e.g., reflected off of the interior of the bowl) through gaps between base 101, ring 105, and lid 104.

Figure 3:
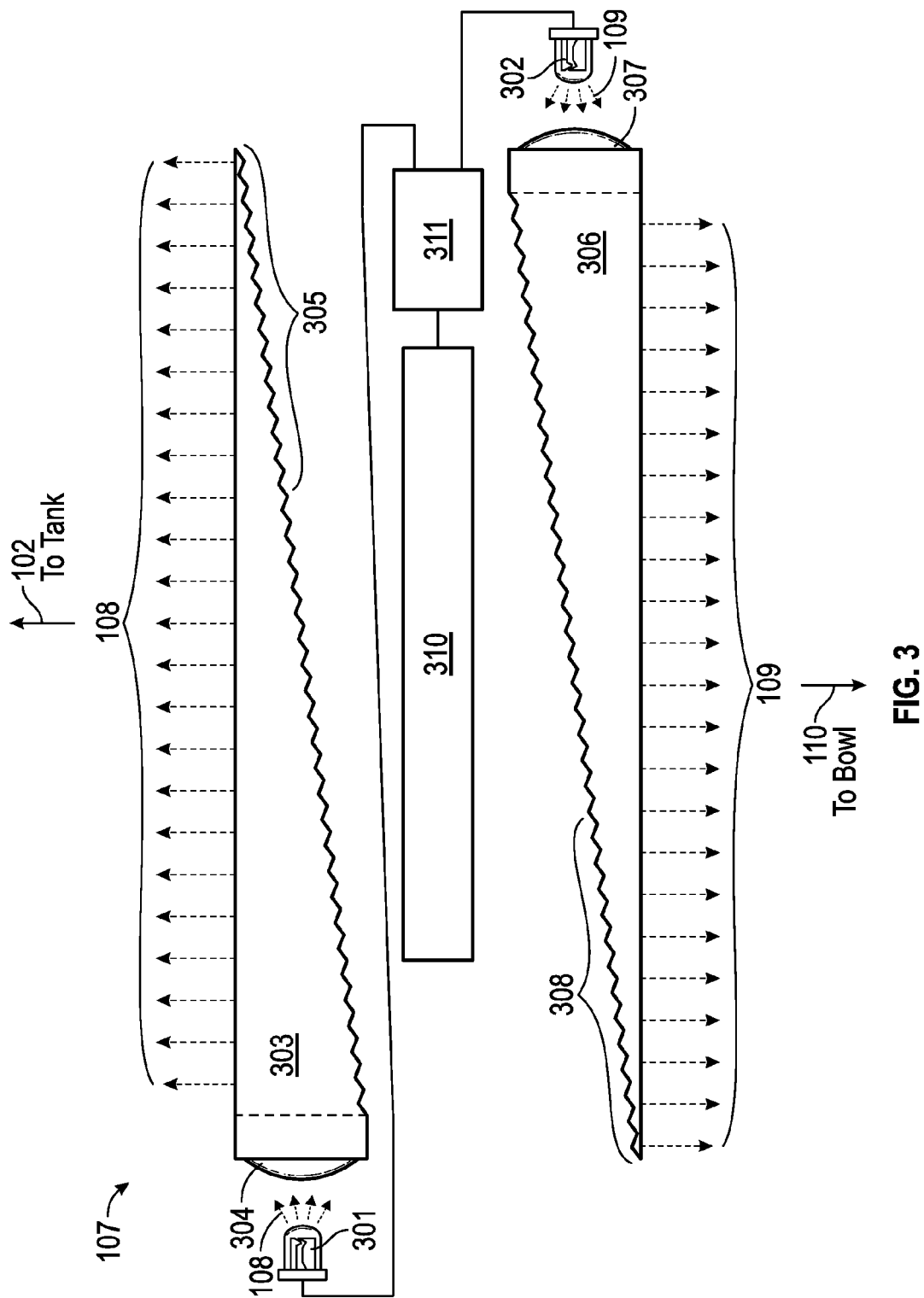
FIG. 3 is a schematic representation of a light assembly usable with the toilet of FIG. 1 according to an exemplary embodiment.

Referring to FIG. 3, a schematic view of lighting mechanism 107 is shown according to an exemplary embodiment. Lighting mechanism 107 includes a first light source and a second light source (shown as first LED 301 and second LED 302). In one embodiment, first LED 301 and second LED 302 are single color LEDs. Alternatively, first LED 301 and second LED 302 are capable of emitting different colors depending on input configurations. First LED 301 directs light into a first reflector, shown as sawtooth reflector 303. First sawtooth reflector 303 is generally wedge shaped, having a first generally linear side, and a second side having sawteeth 305 that intersects the first linear side, and a short third side that is generally parallel with the first side (i.e., a wedge shape having an extended end that has a rectangular cross section). First sawtooth reflector 303 distributes light emitted from first LED 301 across the length of first sawtooth reflector 303 creating a light bar effect (e.g., such that lighting mechanism provides the appearance of an elongated light source, or "light bar"). To achieve the light bar effect, light 108 emitted from first LED 301 first passes through a lens 304 before entering first sawtooth reflector 303. Lens 304 bends light 108 such that light rays are generally parallel. Thus, when light 108 enters first sawtooth reflector 303, it is later reflected off of sawteeth 305 and out toward tank 102. In one embodiment, lens 304 and first sawtooth reflector 303 may be constructed out of acrylic, poly carbonate, or another optically transparent material, which may have an index of refraction of approximately 1.56.

Second LED 302 directs light into a second reflector shown as second sawtooth reflector 306. Second sawtooth reflector 306 includes a lens 307 and sawteeth 308. Second LED 302 and second sawtooth reflector 306 operate in the same manner as first LED 301 and first sawtooth reflector 303, except that second sawtooth reflector 306 is arranged to direct light 109 emitted from second LED 302 into bowl 110 (rather than toward tank 102).

First LED 301 and second LED 302 are, in some embodiments, powered by a battery 310. In other embodiments, other types of power sources may be utilized. A timer 311 is coupled to battery 310 and the LEDs within a control or processing circuit. Timer 311 is configured to control the supply of power to first LED 301 and second LED 302 during user specified time windows.

Figure 4:
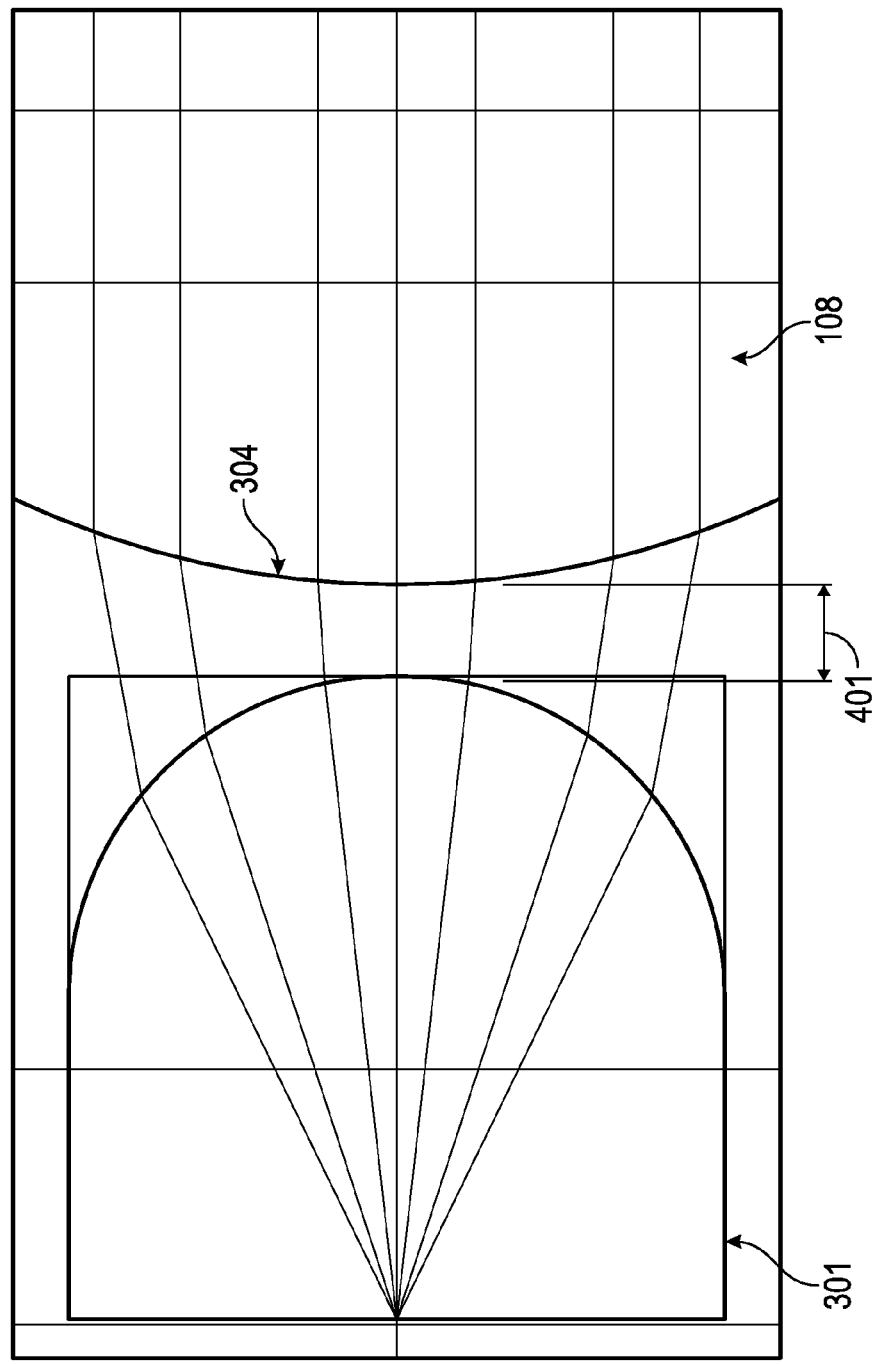
FIG. 4 is a schematic representation of light exiting a light source and entering a reflector through a lens according to an exemplary embodiment.

Referring to FIG. 4, a detailed view of the arrangement of first LED 301 with respect to lens 304 is shown according to an exemplary embodiment. First LED 301 emits light 108, which generally spreads as the light travels away from first LED 301 because the light rays are not parallel. Lens 304 redirects, or bends, light 108 into generally parallel lines, such that light 108 does not continue to spread as it travels away from first LED 301. First LED 301 and lens 304 are separated by distance 401. In one embodiment, distance 401 is less than 1 mm. In further embodiments, distance 401 may be 0.5 mm or another suitable distance. Lens 304 may be curved, and in one embodiment has a radius of curvature of approximately 8 mm. Lens 304 and first sawtooth reflector 303 may be constructed out of acrylic, which in one embodiment has an index of refraction of approximately 1.56. Alternative suitable materials may be used according to other embodiments.

Figure 5:
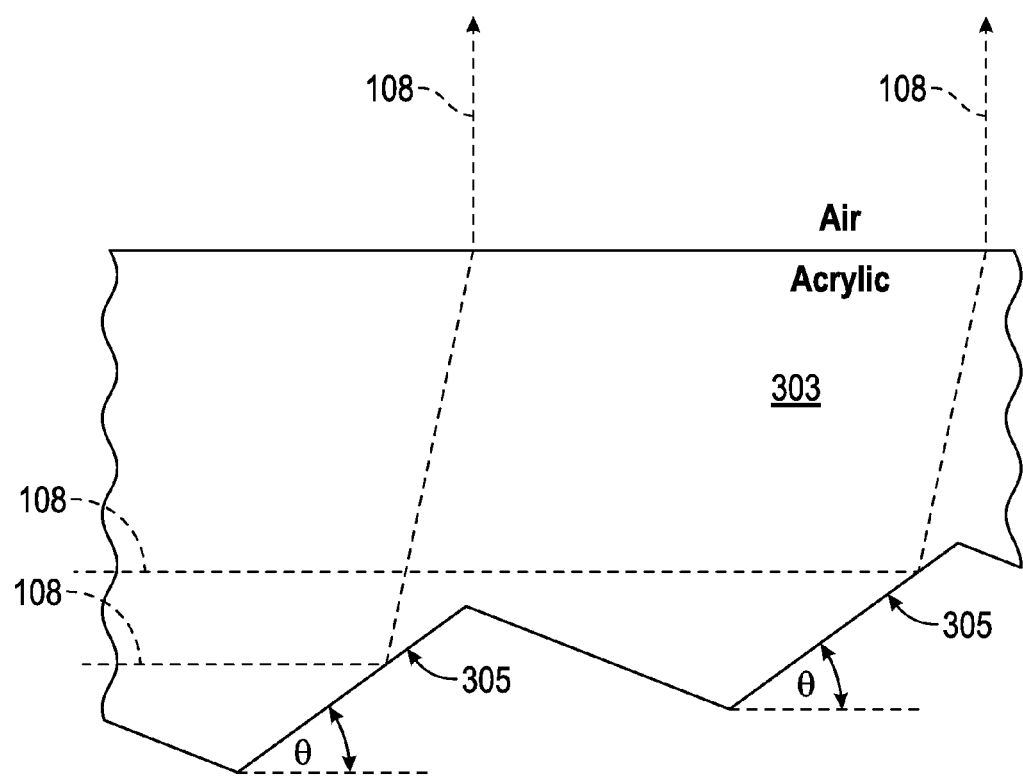
FIG. 5 is a schematic representation of light passing through a reflector according to an exemplary embodiment.

Referring to FIG. 5, a detailed view of light 108 passing through first sawtooth reflector 303 is shown. As light 108 travels through first sawtooth reflector 303, light 108 is reflected off of sawteeth 305. Sawteeth are angled at angle θ relative to the direction of travel of light 108. In one embodiment, angle θ is between 40 and 70 degrees. Angle θ may be approximately 48 degrees. As light 108 is reflected out of first sawtooth reflector 303, light leaves the acrylic body of first sawtooth reflector 303 and enters the atmosphere. Because acrylic has an index of refraction of 1.56 (or a similar suitable incidence of refraction), light 108 is redirected, or bends, as it passes from the acrylic sawtooth reflector 303 into the air. Angle θ is selected such that light 108 leaves first sawtooth reflector 303 at an angle that is generally perpendicular to the angle light 108 entered first sawtooth reflector 303. The combination of teeth 305 at angle θ, lens 304, and the refractive effect of passing light 108 through two different materials work to redirect or bend light 108 approximately 90 degrees.

Figure 6:
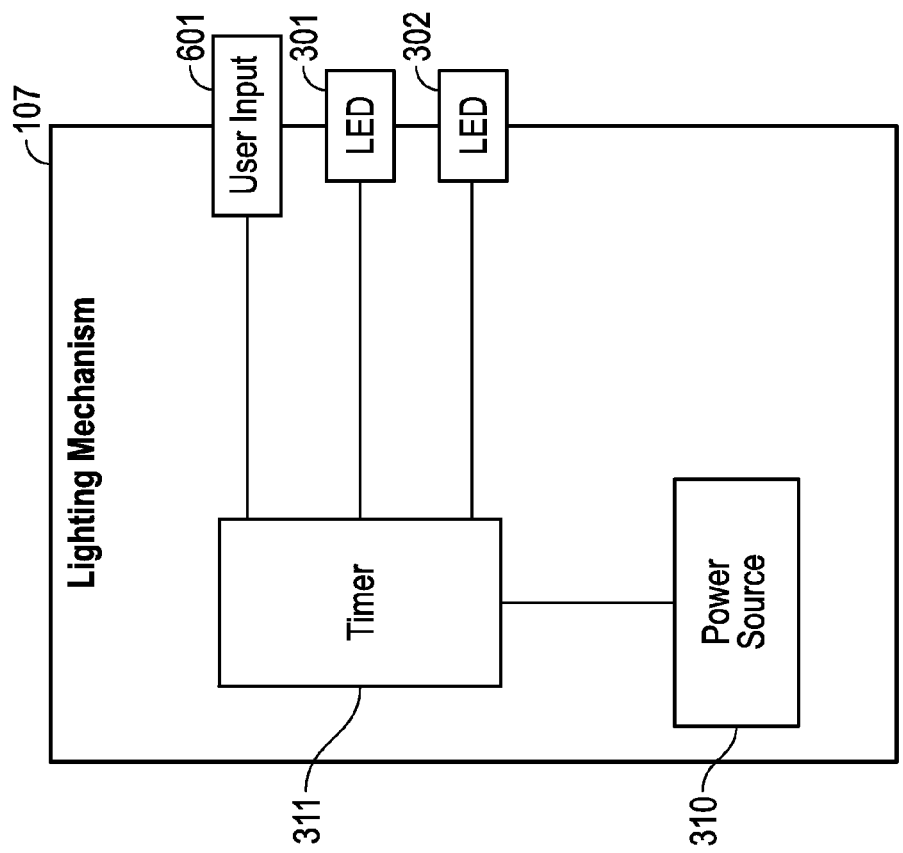
FIG. 6 is a block diagram of a lighting mechanism controller according to an exemplary embodiment.

Referring to FIG. 6, a block diagram of lighting mechanism 107 is shown according to an exemplary embodiment. Lighting mechanism 107 is controlled by timer 311. In one embodiment, timer 311 does not include a clock. Timer 311 functions to turn on first LED 301 and second LED 302 for a user-designated period of time (e.g., 1 hour, 2, hours, 3, hours, 4 hours, etc.). After the expiration of the user-designated period of time, timer 311 turns off first LED 301 and second LED 302 for a second designated period of time. The second designated period of time is calculated by subtracting the user-designated period of time from 24 hours such that the LEDs turn on and off at approximately the same time every day. A user can program the user-designated time period through interaction with user input 601. User input 601 includes an on/off button and a multi-input switch (e.g., a multi-position sliding switch where each position indicates a different user-designated period of time, a button that is pressed to cycle through a set of preset user-designated periods of time, etc.).

According to one embodiment, during setup of lighting mechanism 107, the user first specifies the user-designated period of time. If user input 601 includes a multi-position sliding switch, the user slides the switch into the position corresponding to the desired designated period of time. If user input 601 includes a button used to set the desired designated period of time, the user presses the button a designated number of times. For example, if timer 311 is configured in one hour intervals, the user may press the button six times to set the designated period of time as six hours. Alternatively, if time 311 is configured with a number of pre-set time periods (e.g., 1 hour, 3 hours, and six hours), each press of the button cycles through a pre-set period. Lighting mechanism 107 in one embodiment, does not include a display. Accordingly, lighting mechanism 107 may be configured to pulse first LED 301 and/or second LED 302 to indicate the user-designated period of time. Each pulse indicates the current number of hours selected for the designated time period (e.g., the LEDs will pulse 3 times if the user selects a 3 hour time period). After the user selects the appropriate user-designated period of time, the user interacts with the on/off button to indicate when the LEDs should first be powered on. The pressing of the on/off button starts the user-designated period of time. The user can later press the on/off button again to change the start time of the user-designated period of time. Additionally, if the user presses and holds the on/off button for a certain amount of time (e.g., three seconds), the programming of timer 311 is reset and the LEDs will remain off until reprogrammed. Lighting mechanism 107 may be configured to pulse the LEDs to indicate that timer 311 has been reset. In an alternative configuration, timer 311 includes a clock and a user can program a window of operation by selecting an on time and an off time through interaction with user input 601. In an alternative configuration, LEDs are switched on and off based on sensor feedback. The sensor may be an ambient light sensor, in which case the LEDs are switched on in low ambient light situations and off in high ambient light situations, a motion detector, in which case the LEDs are switched on for a period of time after motion has been detected, or a movement detector, in which case the LEDs may be switched on upon detected pivoting of lid 104 and/or ring 105.

Lighting mechanism 107 is powered by power source 310. Power source 310 may include a rechargeable battery or a non-rechargeable battery. The battery may be a standard size that is commercially available (e.g., AA, AAA, C, D, etc.). Power source 310 is replaceable by a user. During operation, when power source 310 is nearing the end of its life and requires replacement, lighting mechanism 107 may be configured to pulse first LED 301 and/or second LED 302 to alert the user of a low battery level. Alternatively, lighting mechanism 107 may be configured to change the color of one of or both first LED 301 and second LED 302 (e.g., the LEDs normally emit a blue light, but under a low battery condition, the LEDs emit a red light).

Figure 7:
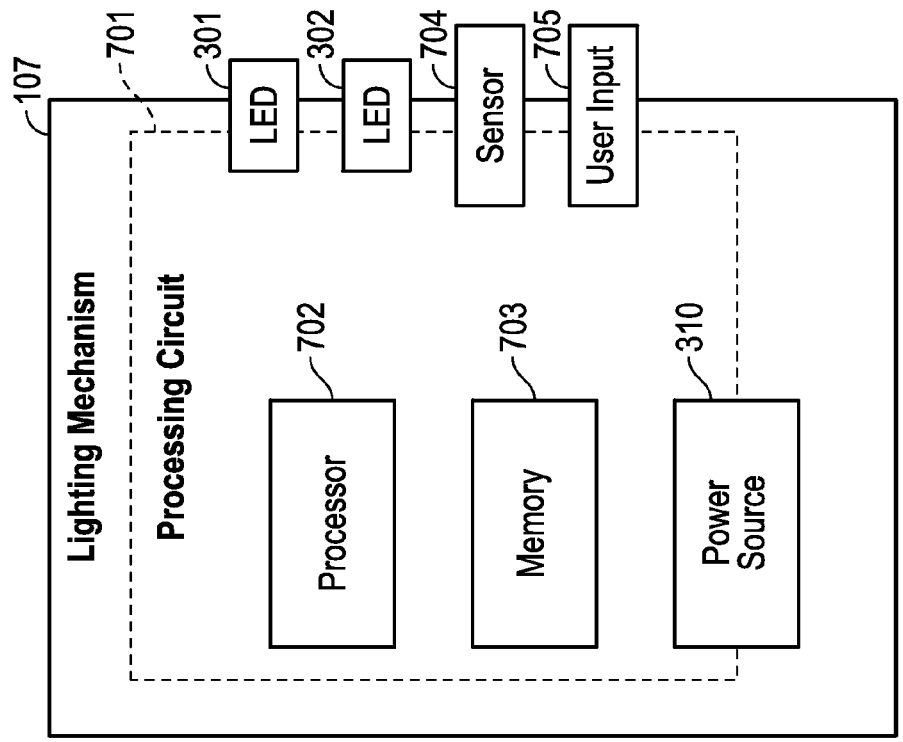
FIG. 7 is a block diagram of a lighting mechanism controller according to another exemplary embodiment.

Referring to FIG. 7, a block diagram of lighting mechanism 107 is shown according to an alternative exemplary embodiment. Lighting mechanism 107 includes processing circuit 701. Processing circuit 701 includes processor 702 and memory 703. Memory 703 stores programming instructions, that, when executed by processor 702, control the operation of lighting mechanism 107. Processing circuit 701 is in communication with first LED 301, second LED 302, optional sensor 704, and user input 705. User input 705 includes at least an on/off button and a multi-input switch. In this arrangement, power source 310 additionally provides operational power to processing circuit 701.

Processing circuit 701 is configured to turn the LEDs on or off based on a user programmed schedule, a user programmed time interval, and/or feedback from sensor 704. Accordingly, processing circuit 701 may be programmed to control the LEDs in the same manner as discussed above with respect to timer 311. However, processing circuit 701 may also be programmed to turn on and off the LEDs based on the time of day, and/or based on sensor 705 feedback. Sensor 705 may be an ambient light sensor configured to provide a feedback signal to processing circuit 701. Accordingly, processing circuit 701 turns on the LEDs when the ambient light falls below a threshold level and turns off the LEDs when the ambient light is above the threshold level. Alternatively, sensor 705 may be a motion detector configured to provide a feedback signal to processing circuit 701 when motion is detected. The motion detector may be a passive infrared motion detector, an ultrasound motion detector, or another suitable type of detector.

Processing circuit 701 is configured to activate the LEDs after motion has been detected and deactivate the LEDs after no motion has been detected for a preset period of time (e.g., 5 minutes). In yet another alternative, sensor 705 may be a movement detector configured to provide a feedback signal to processing circuit 701 when pivoting of lid 104 and/or ring 105 is detected. Processing circuit 701 is configured to active LEDs after movement of lid 104 and/or ring 105 has been moved and deactivate when no movement has been detected for a present period of time (e.g., 5 minutes). The use of processing circuit 701 enables more complex LED activation and deactivation programs than the use of timer 311. For example, a user may program a user-designated time period for LED activation (as discussed above with respect to timer 311) in conjunction with sensor 705 triggers. Accordingly, the LEDs may only be activated when the time is within the user-designated period of time and when sensor 705 is triggered. Such an arrangement may allow for LEDs to be initially toggled on when a low ambient light environment is detected during the user-designated period of time, but turned off when the ambient light is high (e.g., the bathroom user turns on the bathroom lights) during the user-designated period of time.

Figure 9:
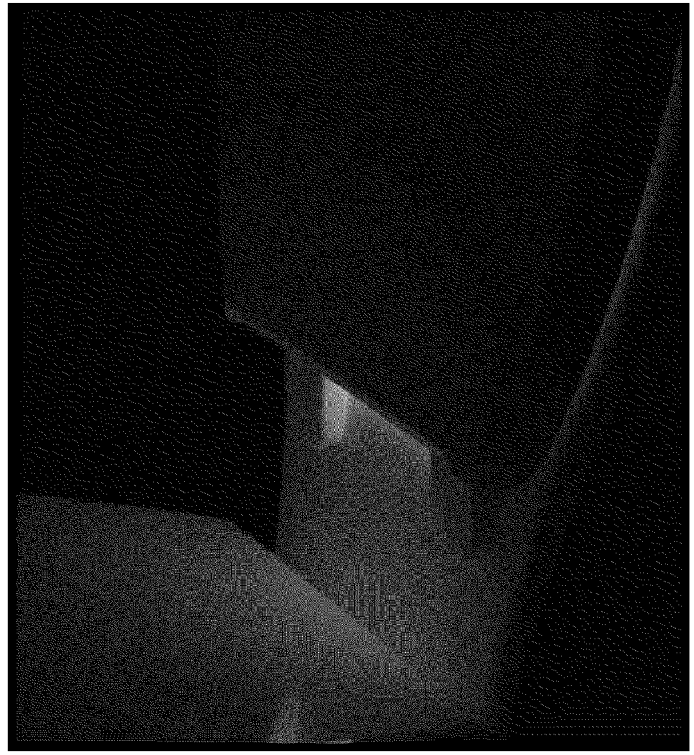
FIG. 9 is a view of a toilet with the lid of a seat assembly in a closed position and a light mechanism activated according to an exemplary embodiment.
Figure 8:
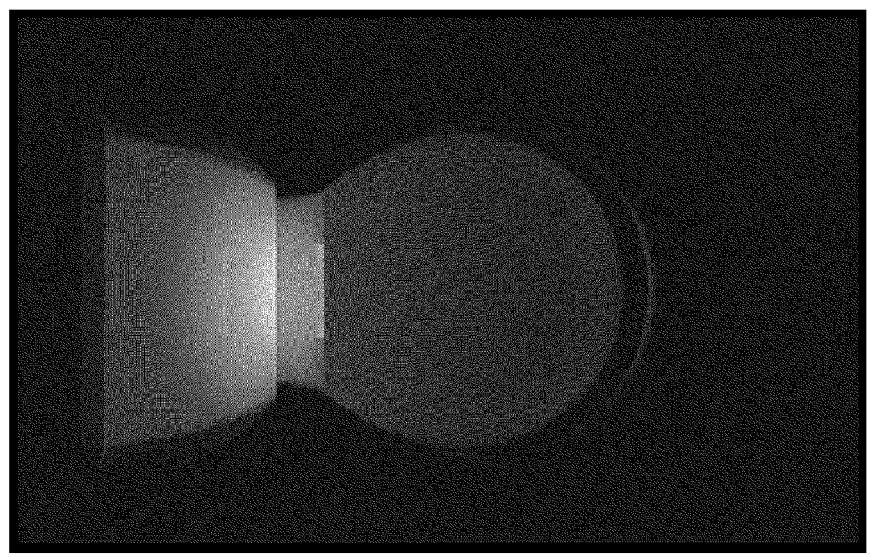
FIG. 8 is a view of a toilet with the lid of a seat assembly in a closed position and a light mechanism activated according to an exemplary embodiment.
Figure 11:
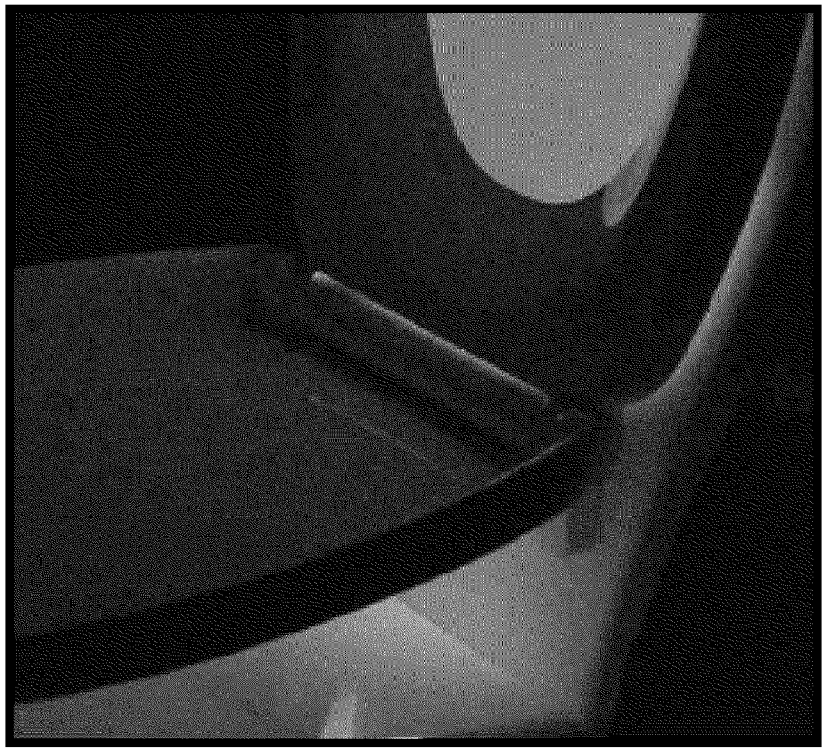
FIG. 11 is a view of a toilet with the lid of a seat assembly in an opened position, the ring of a seat assembly in a closed position, and a lighting mechanism activated according to an exemplary embodiment.
Figure 10:
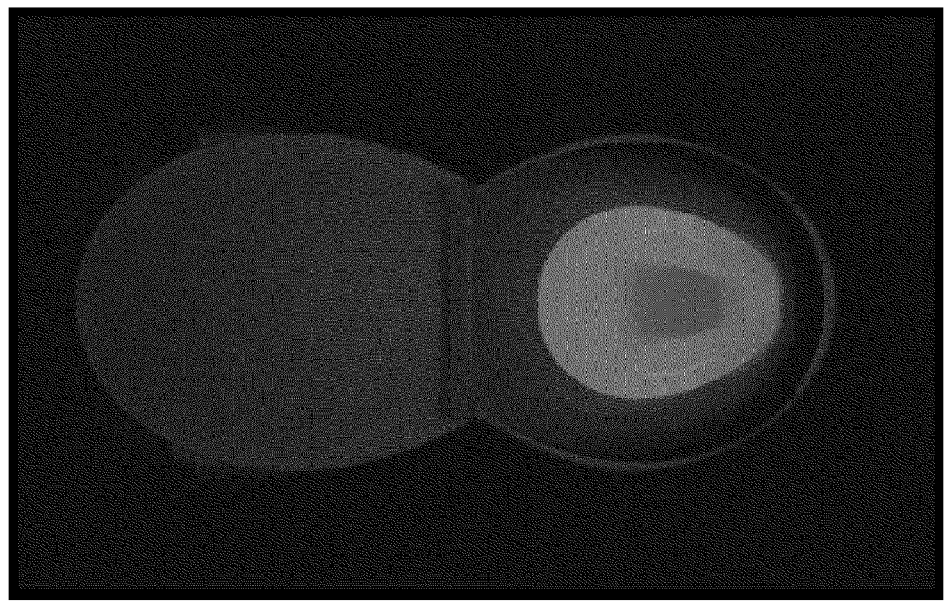
FIG. 10 is a view of a toilet with the lid of a seat assembly in an opened position, the ring of a seat assembly in a closed position, and a lighting mechanism activated according to an exemplary embodiment.
Figure 13:
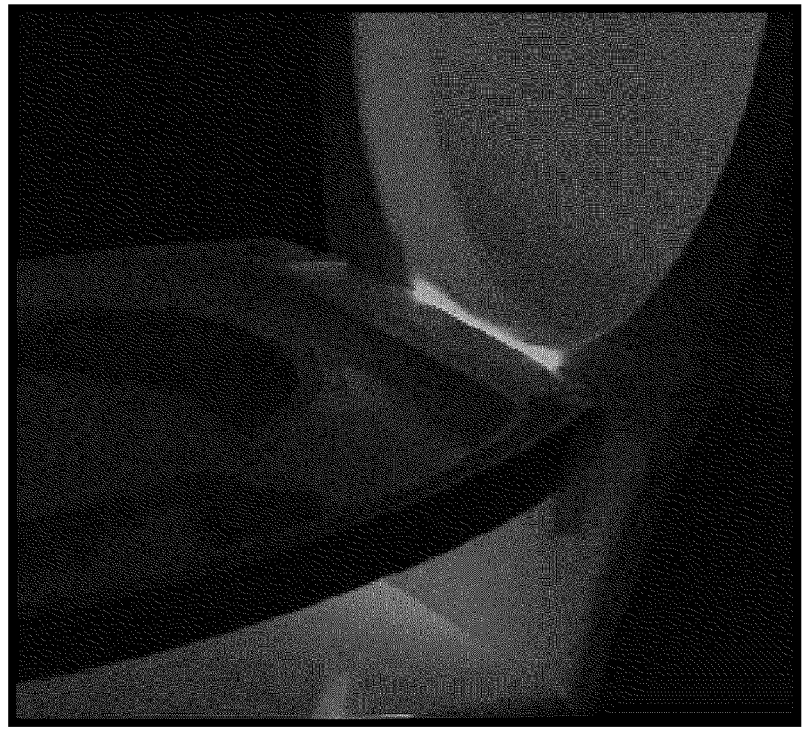
FIG. 13 is a view of a toilet with the lid and the ring of a seat assembly in a raised position and a lighting mechanism activated according to an exemplary embodiment.
Figure 12:
FIG. 12 is a view of a toilet with the lid and the ring of a seat assembly in a raised position and a lighting mechanism activated according to an exemplary embodiment.

Referring to FIG. 8 and FIG. 9, additional views of toilet 100 are shown with lid 104 in a closed position and lighting mechanism 107 activated. Referring to FIG. 10 and FIG. 11, additional views of toilet 100 are shown with lid 104 in a raised position, ring 105 in a lowered position, and lighting mechanism 107 activated. Referring to FIG. 12 and FIG. 13, additional views of toilet 100 are shown with both lid 104 and ring 105 in a raised position while lighting mechanism 107 is activated.

Figure 15:
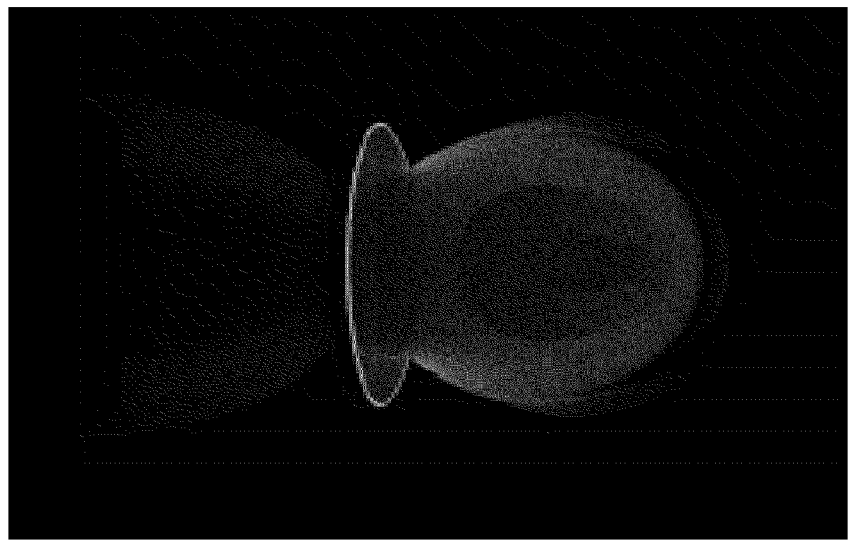
FIG. 15 is a view of a toilet with the lid of a seat assembly in an opened position, the ring of a seat assembly in a closed position, and a lighting mechanism activated according to an exemplary embodiment.
Figure 14:
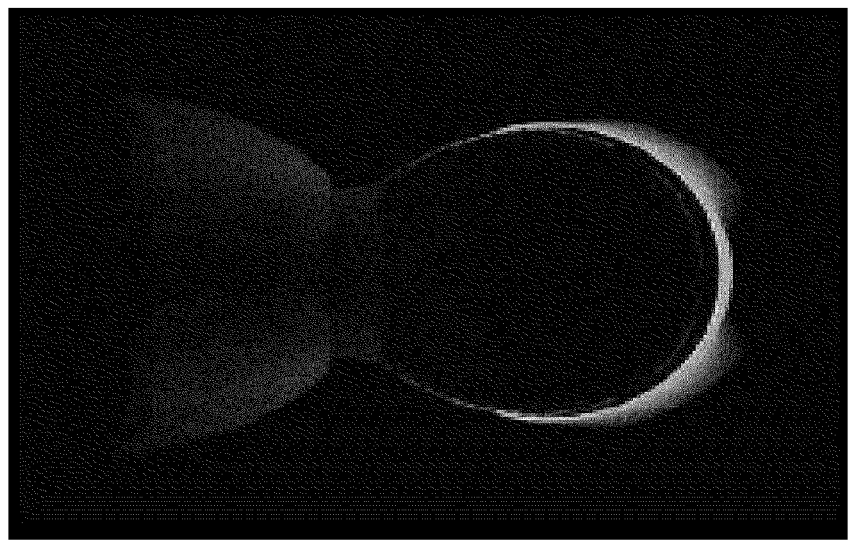
FIG. 14 is a view of a toilet with the lid of a seat assembly in a closed position and a light mechanism activated according to an exemplary embodiment.
Figure 17:
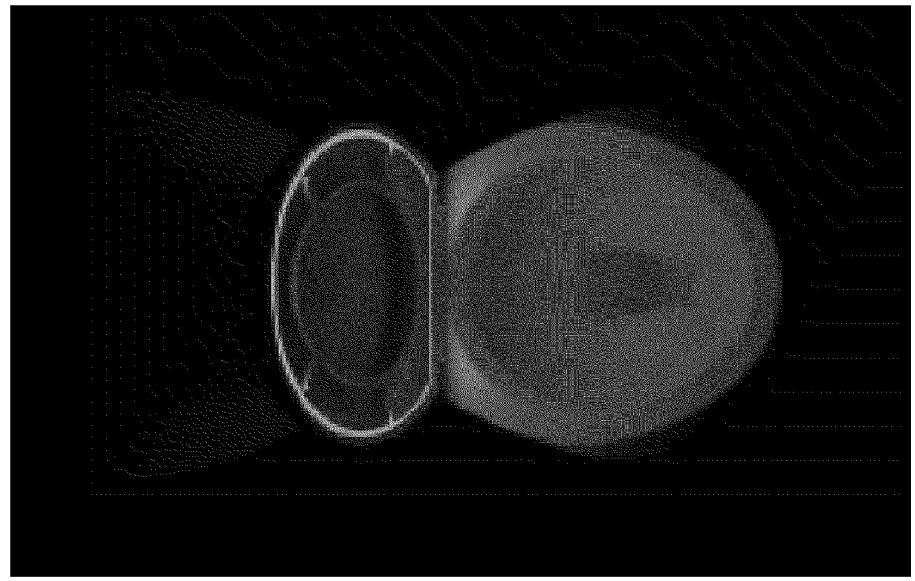
FIG. 17 is a view of a toilet with the lid and the ring of a seat assembly in a raised position and a lighting mechanism activated according to an exemplary embodiment.
Figure 16:
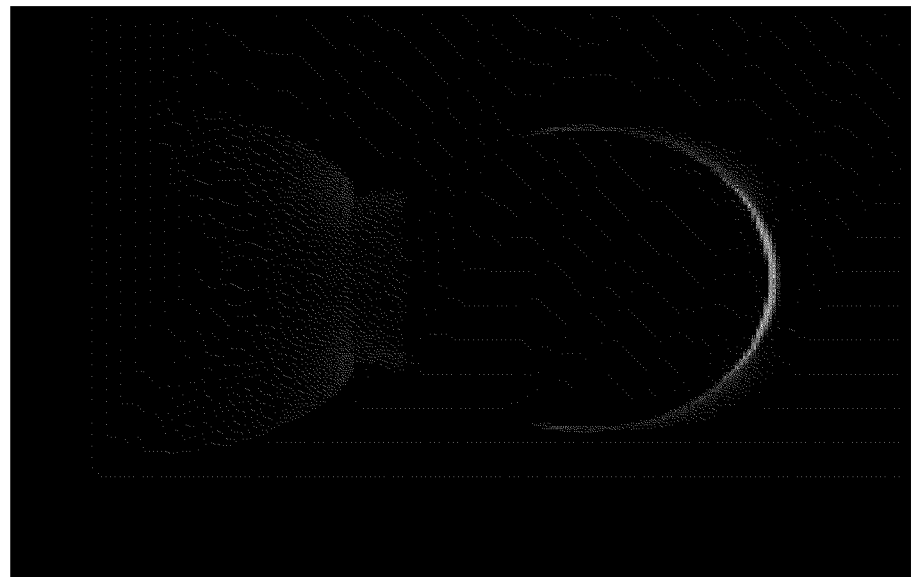
FIG. 16 is a view of a toilet with the lid of a seat assembly in a closed position and a light mechanism activated according to an exemplary embodiment.

In an alternate arrangement, the lighting effect is achieved through a light mechanism (e.g., a light rope, fluorescent ink, luminescent ink, etc.) placed along or integrated into the underside of lid 104 (as shown in FIG. 14 and FIG. 15) and/or ring 105 (as shown in FIG. 16 and FIG. 17). Such additional light mechanisms may include similar features to light mechanism 107, and may be controlled using the same or different control circuitry.

Figure 18:
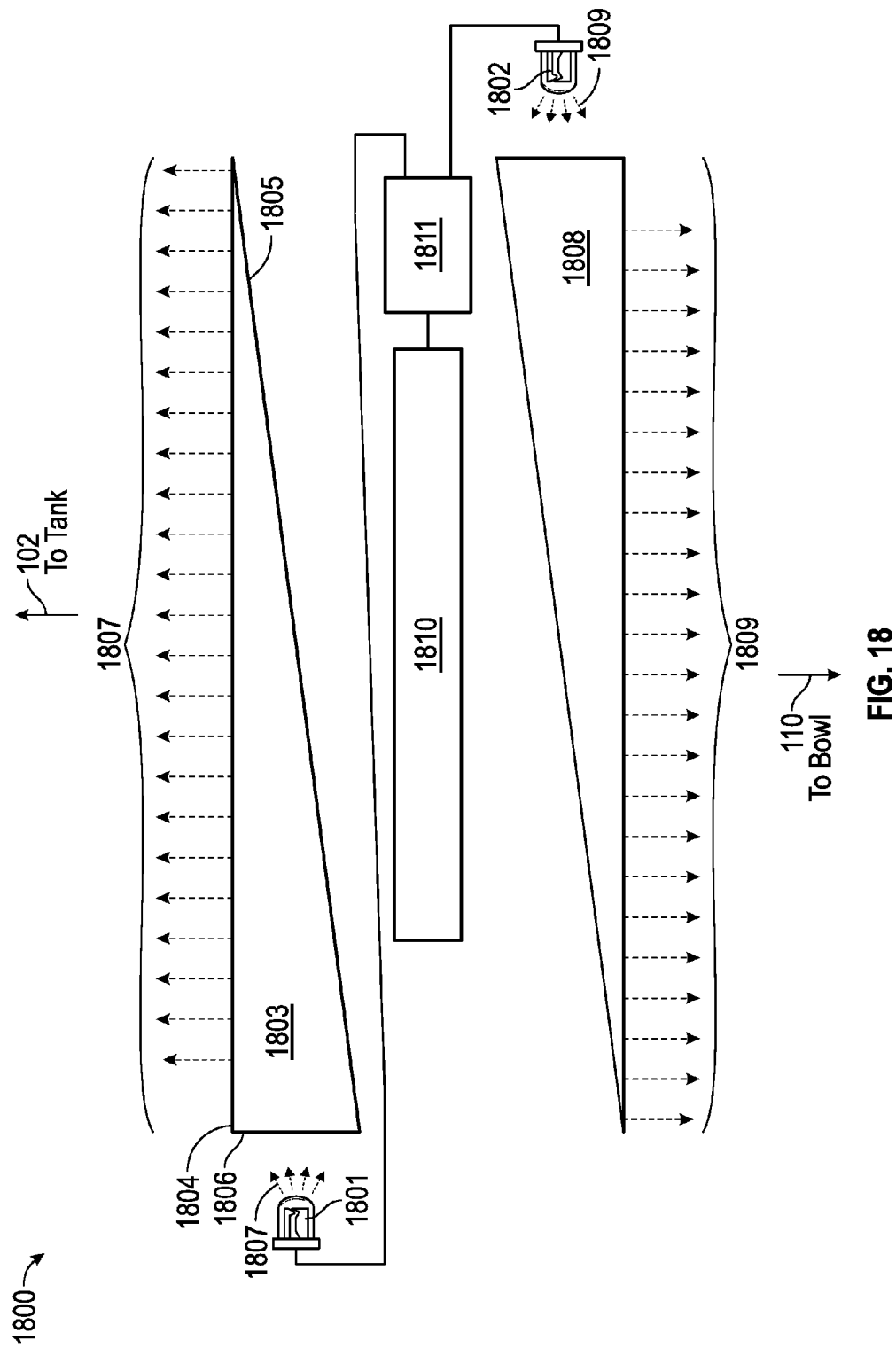
FIG. 18 is a schematic representation of a light assembly usable with the toilet of FIG. 1 according to another exemplary embodiment.

Referring to FIG. 18, a schematic view of lighting mechanism 1800 is shown according to an exemplary embodiment. Lighting mechanism 1800 is similar to lighting mechanism 107. Lighting mechanism 1800 may be used with toilet 100 in place of lighting mechanism 107. Lighting mechanism 1800 may be positioned within hinge assembly 106 in a similar manner as described above with respect to lighting mechanism 107. Lighting mechanism 1800 is generally configured to direct light into an interior of bowl 110 and to direct light toward tank 102.

Lighting mechanism 1800 includes a first light source and a second light source (shown as first LED 1801 and second LED 1802). In one embodiment, first LED 1801 and second LED 1802 are single color LEDs. Alternatively, first LED 1801 and second LED 1802 are capable of emitting different colors depending on input configurations. First LED 1801 directs light into a first reflector 1803. First reflector 1803 is generally wedge shaped, having a first generally linear side 1804 that intersects a second generally linear side 1805 and a short third side 1806 that is generally perpendicular with the first side. In an alternative arrangement second generally linear side includes a short extension that is substantially parallel to the first generally linear side 1804 (i.e., forming a wedge shape having an extended end that has a rectangular cross section similar to lighting mechanism 107). Unlike lighting mechanism 107, the second generally linear side 1805 is substantially smooth and does not include sawteeth.

However, similar to lighting mechanism 107, first reflector 1803 distributes light 1807 emitted from first LED 1801 across the length of the first generally linear side 1804 creating a light bar effect (e.g., such that lighting mechanism provides the appearance of an elongated light source, or "light bar"). The light bar effect of lighting mechanism 1800 may achieve a less intense light bar effect of lighting mechanism 107, which results in light 1807 creating a glowing effect directed toward tank 102. In one embodiment, first reflector 103 may be constructed out of acrylic, poly carbonate, or another optically transparent material, which may have an index of refraction of approximately 1.56.

Second LED 1802 directs light into a second reflector 1808. Second reflector 1808 is similar in construction, size, and shape as first reflector 1803. Second LED 1802 and second reflector 1808 operate in the same manner as first LED 1801 and first reflector 1803, except that second reflector 1807 is arranged to direct light 1809 emitted from second LED 1802 toward bowl 110 (rather than toward tank 102).

First LED 1801 and second LED 1802 are, in some embodiments, powered by a battery 1810. In other embodiments, other types of power sources may be utilized. A timer 1811 is coupled to battery 1810 and the LEDs. Timer 1811 is part of a control or processing circuit (e.g., as described above with respect to FIG. 6). Timer 1811 is configured to control the supply of power to first LED 1801 and second LED 1802 during user specified time windows in a similar manner as described above with respect to timer 311 and LEDs 301 and 302.

The terms "approximately," "about," "substantially" and "similar" are used here in the broad sense in line with their usage commonly allowed by those skilled in the art familiar with the field of this description. One skilled in the art will understand upon reading this description that these terms are used to allow a description of certain described and claimed features without restricting the scope of those features to precise numerical values. Consequently, these terms should be interpreted as indicating that the modifications or developments of the embodiments described and claimed are included in the scope of the invention as defined in the claims.

The terms "example" and "exemplary" are used to describe several embodiments and indicates that those embodiments are possible examples, depictions and/or illustrations of different embodiments (these terms are not used to indicate that certain embodiments are necessarily extraordinary or high-quality examples).

The terms "couple," "connect" and similar terms used here refer to the junction of two elements to each other directly or indirectly. This junction may be fixed (i.e., permanent) or movable (i.e., removable or detachable). This junction may be done with two elements where the two elements and any additional intermediate element are fully formed as a single unitary body, or with two elements where the two elements and any additional intermediate element are fastened to each other.

The references used regarding the position of the elements (for example, "upper," "lower," "above," "below," etc.) are simply used to describe the orientation of the various elements in the FIGURES. The orientation of these various elements may vary as a function of different embodiments, and the variation is included in the scope of the description.

The construction and arrangement of the different embodiments are purely illustrative. Although only some embodiments have been described in detail in the description, one skilled in the art will easily see, upon reading the description, the possible modifications (for example, variation of the sizes, dimensions, structures, shapes and proportions of the different elements, parameter values, assembly types, use of material, colors, orientations, etc.) that can be made without going beyond the scope of the description. For example, the elements illustrated having a single body may be built from multiple parts or elements, the position of the elements may be reversed or modified, and the nature and number of elementary elements or positions may be modified or altered. Other substitutions, modifications, changes and deletions may also be made to the operating conditions and the arrangement of the different embodiments without going beyond the scope of the description.

What is claimed is:

1. A toilet assembly, comprising:
   a toilet base including a bowl;
   a tank coupled to the toilet base;
   a seat assembly connected to the toilet base, the seat assembly comprising:
     a hinge assembly comprising a hinge housing and a lighting mechanism at least partially encapsulated by the hinge housing, the lighting mechanism including a first light source, a reflector configured to distribute the light emitted by the first light source along a length of the reflector thereby creating a light bar effect, and a power source;
     a lid pivotally connected to the hinge assembly;
     a ring pivotally connected to the hinge assembly;
   wherein the lighting mechanism is configured to direct light at the tank and to direct light into the bowl such that light is reflected off of the tank and off of an interior surface of the bowl.

2. The toilet assembly of claim 1, wherein the lighting mechanism further includes a second light source, wherein the first light source is configured to emit a first light that is directed at the tank and the second light source is configured to emit a second light that is directed into the bowl.

3. The toilet assembly of claim 1, further comprising a timer configured to activate and deactivate the first light source according to a schedule.

4. The toilet assembly of claim 1, wherein the reflector includes a plurality of angled surfaces, the reflector configured to bend the light emitted from the first light source by approximately 90 degrees.

5. The toilet assembly of claim 1, wherein the light emitted from the first light source travels through the reflector generally linearly along a line, and wherein the angled surfaces are angled at an angle of 40 and 70 degrees away from the line traveled by the light.

6. The toilet assembly of claim 5, wherein the angle is approximately 48 degrees.

7. The toilet assembly of claim 1, wherein the reflector is made of acrylic or polycarbonate.

8. The toilet assembly of claim 1, wherein when the lid and ring are in a closed position, light passes outward from around a portion of a periphery of the seat assembly.

9. The toilet assembly of claim 1, wherein the lid is in an open position, the light illuminates the interior of the bowl beneath the ring.

10. The toilet assembly of claim 1, wherein when the lid and the ring are in open positions, the light illuminates the interior of the bowl and the inner, upper peripheral portion of the bowl defining a perimeter of the interior of the bowl.

11. A toilet seat assembly, comprising:
    a hinge assembly comprising a hinge housing and a lighting mechanism at least partially encapsulated by the hinge housing, the lighting mechanism including a first light source;

a reflector configured to distribute the light emitted by the first light source along a length of the reflector body thereby creating a light bar effect;
a lid pivotally connected to the hinge assembly;
a ring pivotally connected to the hinge assembly;
wherein the lighting mechanism is configured to direct light at a tank of a toilet and to direct light into a bowl of the toilet such that light is reflected off of the tank and off of an interior of the bowl.

12. The toilet seat assembly of claim 11, wherein the lighting mechanism further includes a second light source, wherein the first light source is configured to emit a first light that is directed at the tank and the second light source is configured to emit a second light that is directed into the bowl.

13. The toilet seat assembly of claim 11, further comprising a timer configured to activate and deactivate the first light source according to a user configurable schedule.

14. The toilet seat assembly of claim 11, wherein the reflector includes a plurality of angled surfaces, the reflector configured to bend the light emitted from the first light source by approximately 90 degrees.

15. The toilet seat assembly of claim 14, wherein the light emitted from the first light source travels through the reflector generally linearly along a line, and wherein the angled surfaces are angled at an angle of between 40 and 70 degrees away from the line traveled by the light.

16. The toilet seat assembly of claim 15, wherein the angle is approximately 48 degrees.

17. The toilet seat assembly of claim 11, wherein the reflector is a sawtooth reflector made of acrylic or polycarbonate.

* * * * *